(12) United States Patent
Akiguchi et al.

(10) Patent No.: US 12,327,429 B2
(45) Date of Patent: Jun. 10, 2025

(54) CUSTOMER ANALYSIS APPARATUS, CUSTOMER ANALYSIS METHOD, AND NON-TRANSITORY STORAGE MEDIUM

(71) Applicant: NEC Corporation, Tokyo (JP)

(72) Inventors: Makiko Akiguchi, Tokyo (JP); Azusa Furukawa, Tokyo (JP); Kei Shibuya, Tokyo (JP); Kan Arai, Tokyo (JP); Hiroshi Hashimoto, Tokyo (JP); Ken Hanazawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/512,750

(22) Filed: Nov. 17, 2023

(65) Prior Publication Data
US 2024/0087359 A1  Mar. 14, 2024

Related U.S. Application Data (63) Continuation of application No. 17/801,936, filed as application No. PCT/JP2020/008442 on Feb. 28, 2020, now Pat. No. 12,211,313.

(51) Int. Cl.
*G06V 40/16* (2022.01)
*G06Q 30/0201* (2023.01)
(Continued)

(52) U.S. Cl.
CPC ....... *G06V 40/168* (2022.01); *G06Q 30/0201* (2013.01); *G06T 7/246* (2017.01);
(Continued)

(58) Field of Classification Search
CPC ........... G06Q 30/0643; G06Q 30/0226; G06Q 30/0269; G06Q 30/0251; G06Q 30/0201;
(Continued)

(56) References Cited

U.S. PATENT DOCUMENTS 11,763,374 B2   9/2023  Miyagi
11,798,064 B1   10/2023  Rodriguez et al.
(Continued)

FOREIGN PATENT DOCUMENTS

CN   104281964 A  *  1/2015
CN   110378299 A  *  10/2019  ......... G06K 9/00718
(Continued)

OTHER PUBLICATIONS

International Search Report for PCT Application No. PCT/JP2020/008442, mailed on Jul. 7, 2020.
(Continued)

*Primary Examiner* — Dung Hong (57) ABSTRACT

A customer analysis apparatus (10) includes an image acquisition unit (110) and an image processing unit (120). The image acquisition unit (110) acquires a first image generated by a first image capture unit (22) and a second image generated by a second image capture unit (24). The image processing unit (120) processes the first image and the second image. More specifically, the image processing unit (120) generates product information indicating a product (50) taken out from a product shelf (40), by processing the first image and the second image. Further, the image processing unit (120) generates customer attribute information of a customer taking out the product (50), by processing the first image. Then, the image processing unit (120) causes a result storage unit (130) to store the product information and the customer attribute information in association with each other.

6 Claims, 6 Drawing Sheets

(51) Int. Cl.
  *G06T 7/246*   (2017.01)
  *G06T 7/292*   (2017.01)
  *G06T 11/00*   (2006.01)
  *G06V 20/52*   (2022.01)

(52) U.S. Cl.
  CPC .............. *G06T 7/292* (2017.01); *G06T 11/00* (2013.01); *G06V 20/52* (2022.01); *G06T 2210/16* (2013.01)

(58) Field of Classification Search
  CPC ...... G06V 40/168; G06V 20/52; G06T 7/292; G06T 7/246; G06T 11/00; G06T 2210/16
  See application file for complete search history.

(56) References Cited

U.S. PATENT DOCUMENTS

| | | |
|---|---|---|
| 11,887,051 B1 | 1/2024 | Guan et al. |
| 11,914,785 B1 | 2/2024 | Glaser et al. |
| 12,080,135 B2 | 9/2024 | Iwai |
| 2011/0176005 A1 | 7/2011 | Kaneko et al. |
| 2014/0279246 A1* | 9/2014 | Chen ................. G06F 16/9538 705/26.61 |
| 2015/0029339 A1 | 1/2015 | Kobres et al. |
| 2015/0262460 A1 | 9/2015 | Ito |
| 2016/0196575 A1 | 7/2016 | Uchida et al. |
| 2016/0203497 A1* | 7/2016 | Tietzen ............. G06Q 30/0201 705/14.27 |
| 2018/0096353 A1 | 4/2018 | Matsui |
| 2019/0005535 A1 | 1/2019 | Uchida et al. |
| 2019/0005536 A1 | 1/2019 | Uchida et al. |
| 2019/0005537 A1 | 1/2019 | Uchida et al. |
| 2021/0142490 A1 | 5/2021 | Shiraishi |
| 2021/0233110 A1* | 7/2021 | Ye ..................... G06Q 30/0255 |
| 2021/0304256 A1 | 9/2021 | Ishida et al. |
| 2024/0265789 A1 | 8/2024 | Zalewski et al. |

FOREIGN PATENT DOCUMENTS

| | | | |
|---|---|---|---|
| JP | 2016-062564 A | 4/2016 | |
| JP | 2016-200873 A | 12/2016 | |
| JP | 2018-055248 A | 4/2018 | |
| JP | 2019-113976 A | 7/2019 | |
| KR | 101885669 B1 * | 9/2018 | |
| WO | 2015/033575 A1 | 3/2015 | |
| WO | 2016/043093 A1 | 3/2016 | |
| WO | WO-2018124476 A1 * | 7/2018 | ............. G06Q 30/02 |
| WO | 2018/235198 A1 | 12/2018 | |

OTHER PUBLICATIONS

JP Office Action for JP Application No. 2022-503028, mailed on Sep. 26, 2023 with English Translation.
US Notice of Allowance for U.S. Appl. No. 17/801,936, mailed on Sep. 26, 2024.
Liciotti et al., "Shopper Analytics: a customer activity recognition system using a distributed RGB-D camera network" (Year: 2015).

* cited by examiner

| DATE AND TIME | PRODUCT INFORMATION | CUSTOMER ATTRIBUTE INFORMATION | PURCHASED OR NOT |
|---|---|---|---|
| | | | |
| | | | |

CUSTOMER ANALYSIS APPARATUS, CUSTOMER ANALYSIS METHOD, AND NON-TRANSITORY STORAGE MEDIUM

This application is a Continuation of U.S. application Ser. No. 17/801,936 filed on Aug. 24, 2022, which is a National Stage Entry of PCT/JP2020/008442 filed on Feb. 28, 2020, the contents of all of which are incorporated herein by reference, in their entirety.

TECHNICAL FIELD

The present invention relates to a customer analysis apparatus, a customer analysis method, and a program.

BACKGROUND ART

Analysis of an attribute of a customer when the customer takes out a product from a product shelf at a store is under study. For example, Patent Document 1 describes providing an image sensor for each product type, capturing an image of a customer by using the image sensor, and estimating an attribute of the customer by analyzing the image.

RELATED DOCUMENT

Patent Document

Patent Document 1: Japanese Patent Application Publication No. 2018-55248

SUMMARY OF THE INVENTION

Technical Problem

The present inventor has examined determination of an attribute of a customer taking out a product and the product without increasing the number of image capture units. An example object of the present invention is to determine an attribute of a customer taking out a product and the product without increasing the number of image capture units.

Solution to Problem

The present invention provides a customer analysis apparatus used with a first image capture unit and a second image capture unit each capturing an image of at least one of a product placement location and an area in front of the product placement location, the customer analysis apparatus including:
  an image acquisition unit for acquiring a first image generated by the first image capture unit and a second image generated by the second image capture unit; and
  an image processing unit for processing the first image and the second image, wherein
  the first image capture unit, the product placement location, and the second image capture unit are arranged in this order in a first direction,
  the first image capture unit is positioned at a height identical to that of or above the product placement location and captures an image of at least a diagonally lower area, and
  the second image capture unit is positioned at a height identical to that of or below the product placement location and below the first image capture unit and captures an image of at least a diagonally upper area, and
  the image processing unit
    generates product information indicating a product taken out from the product placement location, by processing the first image and the second image,
    generates customer attribute information indicating an attribute of a customer taking out the product, by processing the first image, and
    causes a storage unit to store the product information and the customer attribute information in association with each other.

The present invention provides a customer analysis method performed by a computer used with a first image capture unit and a second image capture unit each capturing an image of at least one of a product placement location and an area in front of the product placement location, the customer analysis method including, by the computer:
  acquiring a first image generated by the first image capture unit and a second image generated by the second image capture unit;
  generating product information indicating a product taken out from the product placement location, by processing the first image and the second image;
  generating customer attribute information indicating an attribute of a customer taking out the product, by processing the first image; and
  causing a storage unit to store the product information and the customer attribute information in association with each other, wherein
  the first image capture unit, the product placement location, and the second image capture unit are arranged in this order in a first direction,
  the first image capture unit is positioned at a height identical to that of or above the product placement location and captures an image of at least a diagonally lower area, and
  the second image capture unit is positioned at a height identical to that of or below the product placement location and below the first image capture unit and captures an image of at least a diagonally upper area.

The present invention provides a program executed by a computer used with a first image capture unit and a second image capture unit each capturing an image of at least one of a product placement location and an area in front of the product placement location, the program causing the computer to execute:
  a function of acquiring a first image generated by the first image capture unit and a second image generated by the second image capture unit;
  a function of generating product information indicating a product taken out from the product placement location, by processing the first image and the second image;
  a function of generating customer attribute information indicating an attribute of a customer taking out the product, by processing the first image; and
  a function of causing a storage unit to store the product information and the customer attribute information in association with each other, wherein
  the first image capture unit, the product placement location, and the second image capture unit are arranged in this order in a first direction,
  the first image capture unit is positioned at a height identical to that of or above the product placement location and captures an image of at least a diagonally lower area, and
  the second image capture unit is positioned at a height identical to that of or below the product placement location and below the first image capture unit and captures an image of at least a diagonally upper area.

Advantageous Effects of Invention

The present invention enables determination of an attribute of a customer taking out a product and the product without increasing the number of image capture units.

BRIEF DESCRIPTION OF THE DRAWINGS

The aforementioned object, other objects, features, and advantages will become more apparent by use of the following preferred example embodiments and accompanying drawings.

DESCRIPTION OF EMBODIMENTS

Example embodiments of the present invention will be described below by using drawings. Note that, in every drawing, similar components are given similar signs, and description thereof is omitted as appropriate.

Figure 1:
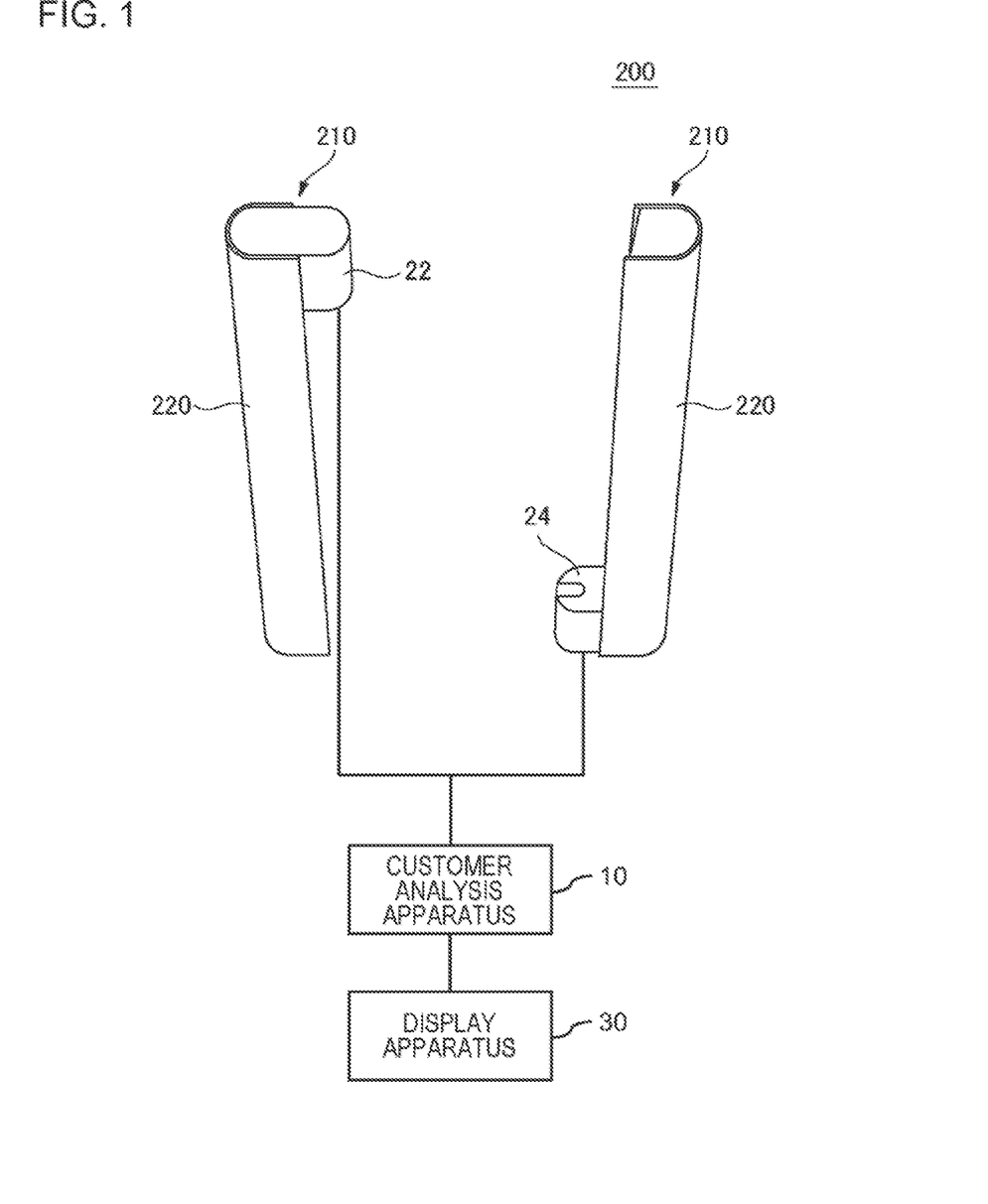
FIG. 1 is a diagram illustrating a use environment of a customer analysis apparatus according to an example embodiment.
Figure 2:
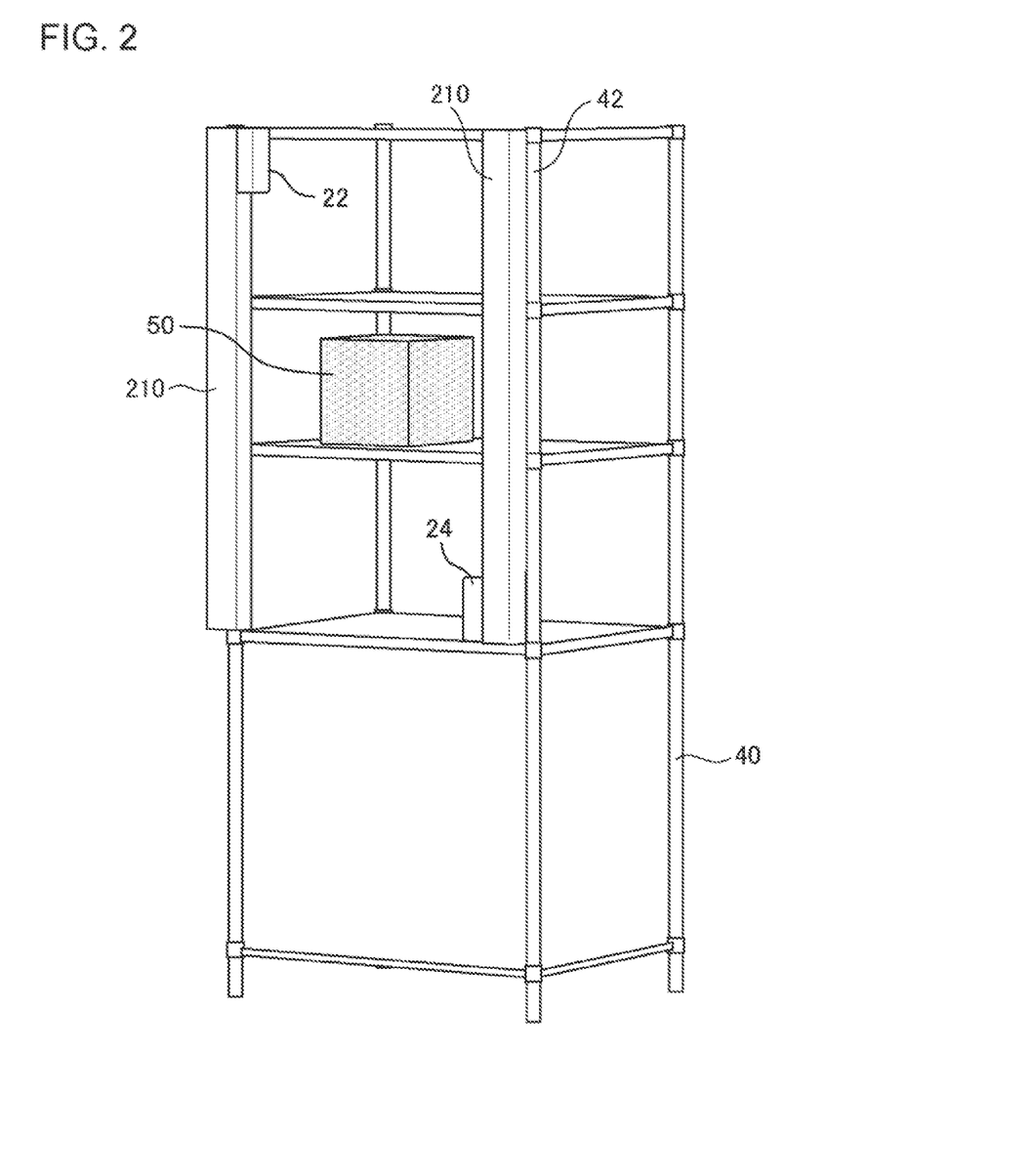
FIG. 2 is a diagram for illustrating an image capture apparatus.

FIG. 1 is a diagram illustrating a use environment of a customer analysis apparatus 10 according to an example embodiment. FIG. 2 is a diagram for illustrating an image capture apparatus 200. The customer analysis apparatus 10 determines a product 50 placed on a product shelf 40 or a product 50 taken out from the product shelf 40, by processing an image generated by the image capture apparatus 200. The product shelf 40 is an example of a product placement area. For example, the product shelf 40 is placed in a store and includes at least one shelf A plurality of types of products 50 are placed on a shelf.

The image capture apparatus 200 captures an image of at least one of a shelf in the product shelf 40 and an area in front of the shelf. In the example illustrated in FIG. 2, the image capture apparatus 200 captures an image of both a shelf in the product shelf 40 and an area in front of the shelf. The image capture apparatus 200 includes two image capturing units 210. One image capturing unit 210 includes a lighting unit 220 and a first image capture unit 22, and the other image capturing unit 210 includes a lighting unit 220 and a second image capture unit 24.

A light emitting surface of the lighting unit 220 extends in one direction and includes a light emitting unit and a cover for covering the light emitting unit. The lighting unit 220 mainly emits light in a direction orthogonal to the extending direction of the light emitting surface. The light emitting unit includes a light emitting device such as an LED and emits light in a direction not being covered by the cover. Note that, when the light emitting device is an LED, a plurality of LEDs are arranged in a direction in which the lighting unit 220 extends (a vertical direction in the diagram).

Each of the first image capture unit 22 and the second image capture unit 24 is provided at one end of a lighting unit 220 and has a direction in which light of the lighting unit 220 is emitted as an image capture area. For example, in an image capturing unit 210 on the left side in FIG. 1 and FIG. 2, the first image capture unit 22 has a lower area and a diagonally lower right area as an image capture area. Further, in an image capturing unit 210 on the right side in FIG. 1 and FIG. 2, the second image capture unit 24 has an upper area and a diagonally upper left area as an image capture area.

As illustrated in FIG. 2, the two image capturing units 210 are mounted on front frames 42 (or at the front of side walls on both sides) of the product shelf 40. At this time, the image capturing unit 210 including the first image capture unit 22 is mounted on one front frame 42 and is oriented in such a way that the first image capture unit 22 is positioned in the upper part, and the image capturing unit 210 including the second image capture unit 24 is mounted on a front frame 42 on the opposite side of the image capturing unit 210 including the first image capture unit 22 and is oriented in such a way that the second image capture unit 24 is positioned in the lower part. Therefore, in a direction in which the shelf extends (an example of a first direction), the first image capture unit 22, the product shelf 40, and the second image capture unit 24 are arranged in this order. Further, the first image capture unit 22 is positioned above the shelf in the product shelf 40, and the second image capture unit 24 is positioned below the shelf in the product shelf 40. Thus, a space between the first image capture unit 22 and the second image capture unit 24 is widened.

Then, the first image capture unit 22 captures an image of a lower area and a diagonally lower area in such a way that the image capture area includes an opening of the product shelf 40 and an area in front of the opening. On the other hand, the second image capture unit 24 captures an image of an upper area and a diagonally upper area in such as way that the image capture area includes the opening of the product shelf 40 and the area in front of the opening. Thus using two image capturing units 210 enables image capture of the entire area including the opening of the product shelf 40 and the area in front of the opening. Therefore, the customer analysis apparatus 10 can determine the product name of a product 50 taken out from the product shelf 40, by processing an image generated by the first image capture unit 22 (hereinafter described as a first image) and an image generated by the second image capture unit 24 (hereinafter described as a second image).

Further, a customer taking out the product 50 is also captured in at least the first image. Therefore, the customer analysis apparatus 10 can generate information indicating an attribute of the customer (hereinafter described as customer attribute information), by processing at least the first image. Attribute information of a customer includes an age, a gender, and a type and an attribute of wearing.

Figure 3:
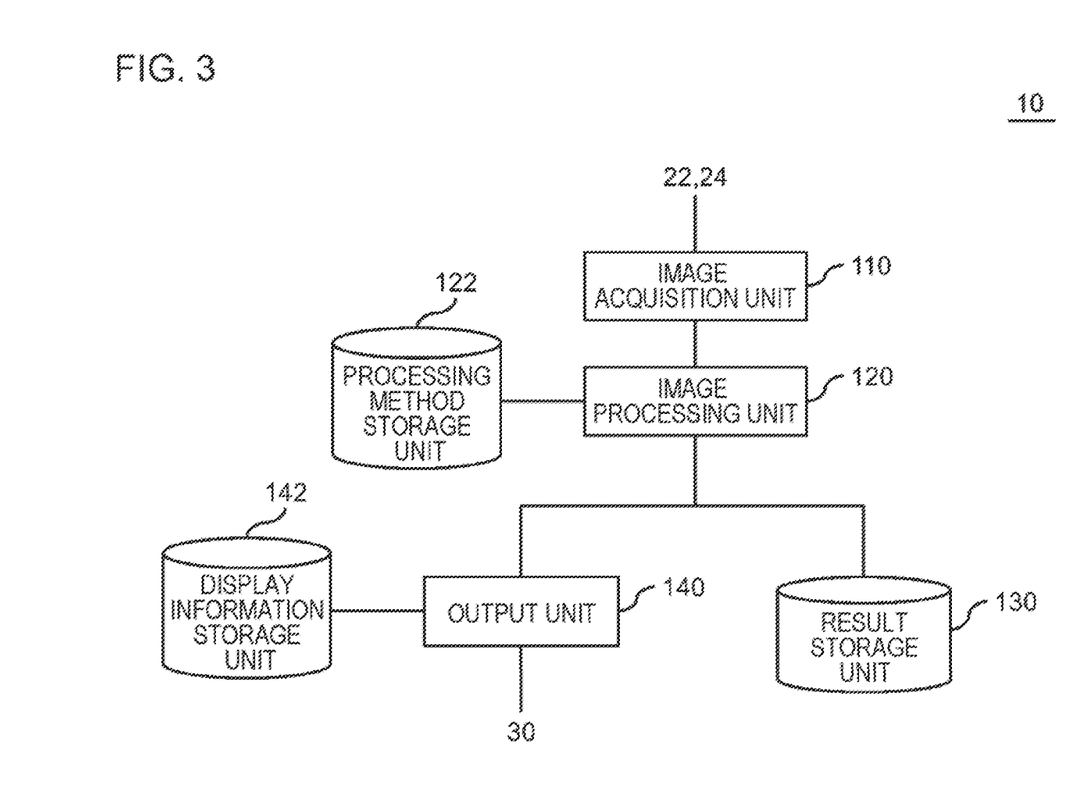
FIG. 3 is a block diagram illustrating an example of a functional configuration of the customer analysis apparatus.

Then, the customer analysis apparatus 10 causes a result storage unit 130 illustrated in FIG. 3 to store information indicating the product name of the determined product 50. Further, the customer analysis apparatus 10 determines display information to be displayed by a display apparatus 30, based on the attribute information of the customer. For example, the display apparatus 30 is provided in the store in which the product shelf 40 is provided. The display apparatus 30 may be installed on the product shelf 40 or in the neighborhood thereof. An example of the display information is advertisement information.

FIG. 3 is a block diagram illustrating an example of a functional configuration of the customer analysis apparatus 10. The customer analysis apparatus 10 includes an image acquisition unit 110 and an image processing unit 120. The image acquisition unit 110 acquires a first image generated by the first image capture unit 22 and a second image generated by the second image capture unit 24. The image processing unit 120 processes a first image and a second image. More specifically, the image processing unit 120 generates product information indicating a product 50 taken out from the product shelf 40, by processing a first image and a second image. Further, the image processing unit 120 generates customer attribute information of a customer taking out the product 50, by processing the first image. Then, the image processing unit 120 causes the result storage unit 130 to store the product information and the customer attribute information in association with each other. Specific examples of the customer attribute information will be described later.

The image processing unit 120 also uses a second image as needed when generating customer attribute information. Examples of customer attribute information generated by using a second image include attribute information related to a customer being short in height such as a child. Specific examples of the attribute information will also be described later.

Further, the image processing unit 120 determines whether a product 50 taken out by a customer is returned to the product shelf 40, by processing a first image and a second image. Thus, whether the product 50 is purchased by the customer can be determined.

When processing a first image and a second image, the image processing unit 120 uses information stored in a processing method storage unit 122. For example, the processing method storage unit 122 stores information required for determining the product name of a product 50 and information required for generating customer attribute information. While examples of the information described above include a feature value, a model generated by machine learning may also be included.

The customer analysis apparatus 10 further includes an output unit 140. The output unit 140 is used with a display information storage unit 142. The display information storage unit 142 stores a plurality of pieces of display information to be displayed by the display apparatus 30, such as advertisement information, in association with customer attribute information related to the display information. Then, by using customer attribute information generated by the image processing unit 120, the output unit 140 acquires display information to be displayed by the display apparatus 30 from the display information storage unit 142 and causes the display apparatus 30 to display the acquired display information.

Note that the processing method storage unit 122, the result storage unit 130, and the display information storage unit 142 are part of the customer analysis apparatus 10 in the example illustrated in this diagram. However, at least part of the units may be positioned outside the customer analysis apparatus 10.

Figure 4:
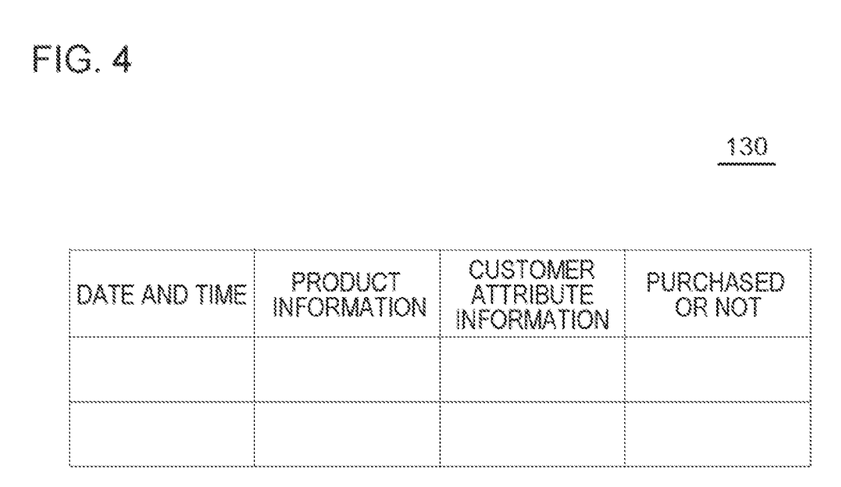
FIG. 4 is a diagram illustrating, in a table format, information stored in a result storage unit.

FIG. 4 is a diagram illustrating, in a table format, information stored in the result storage unit 130. In the example illustrated in this diagram, for each act of a customer taking out a product 50 from the product shelf 40, the result storage unit 130 stores a date and time when the act is performed, product information of the product 50, customer attribute information of the customer, and purchase information indicating whether the product 50 is purchased by the customer.

Figure 5:
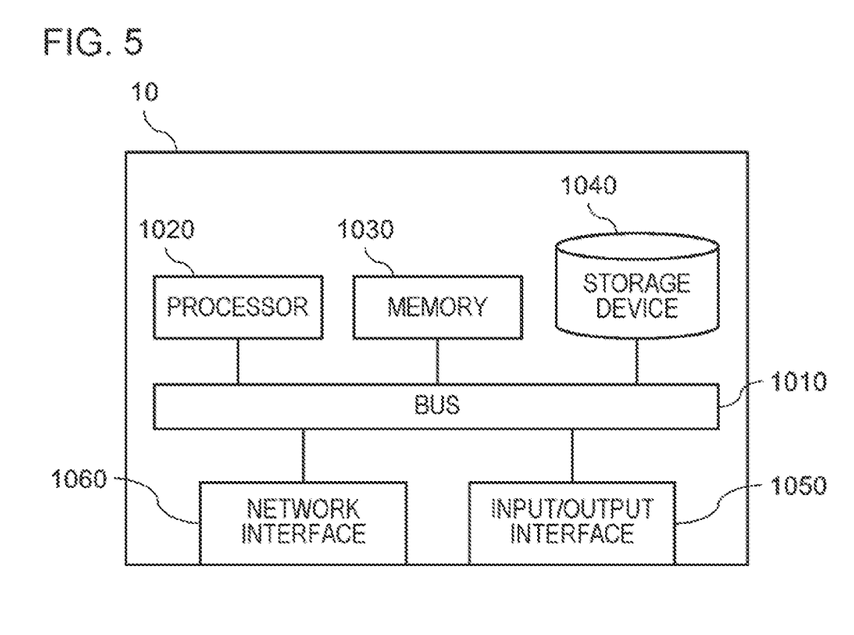
FIG. 5 is a diagram illustrating a hardware configuration example of the customer analysis apparatus.

FIG. 5 is a diagram illustrating a hardware configuration example of the customer analysis apparatus 10. The customer analysis apparatus 10 includes a bus 1010, a processor 1020, a memory 1030, a storage device 1040, an input/output interface 1050, and a network interface 1060.

The bus 1010 is a data transmission channel for the processor 1020, the memory 1030, the storage device 1040, the input/output interface 1050, and the network interface 1060 to transmit and receive data to and from one another. Note that the method of interconnecting the processor 1020 and other components is not limited to a bus connection.

The processor 1020 is a processor provided by a central processing unit (CPU), a graphics processing unit (GPU), or the like.

The memory 1030 is a main storage provided by a random access memory (RAM) or the like.

The storage device 1040 is an auxiliary storage provided by a hard disk drive (HDD), a solid state drive (SSD), a memory card, a read only memory (ROM), or the like. The storage device 1040 stores program modules providing the functions of the customer analysis apparatus 10 (such as the image acquisition unit 110, the image processing unit 120, and the output unit 140). By reading each program module into the memory 1030 and executing the program module by the processor 1020, each function related to the program module is provided. Further, the storage device 1040 also functions as the processing method storage unit 122, the result storage unit 130, and the display information storage unit 142.

The input/output interface 1050 is an interface for connecting the customer analysis apparatus 10 to various types of input/output equipment. For example, the customer analysis apparatus 10 communicates with the customer analysis apparatus 10 through the input/output interface 1050.

The network interface 1060 is an interface for connecting the customer analysis apparatus 10 to a network. Examples of the network include a local area network (LAN) and a wide area network (WAN). The method of connecting the network interface 1060 to the network may be a wireless connection or a wired connection. The customer analysis apparatus 10 may communicate with the customer analysis apparatus 10 through the network interface 1060.

FIG. 5 is a flowchart illustrating an example of processing performed by the customer analysis apparatus 10. The first image capture unit 22 and the second image capture unit 24 repeatedly generate images. While any frame rate is applicable at this time, for example, the frame rate is equal to or greater than 24 frames/sec and equal to or less than 120 frames/sec. Further, a timing at which the first image capture unit 22 generates a first image is synchronized with a timing at which the second image capture unit 24 generates a second image. Every time the first image capture unit 22 and the second image capture unit 24 generate images, the image capture apparatus 200 transmits the generated first image and the generated second image to the customer analysis apparatus 10. Note that intervals at which first images and second images are transmitted by the image capture apparatus 200 may be longer than the frame rates of the first image capture unit 22 and the second image capture unit 24. In this case, the image capture apparatus 200 collectively transmits a plurality of first images and a plurality of second images to the customer analysis apparatus 10. Then, every time a first image and a second image are transmitted, the customer analysis apparatus 10 performs the processing illustrated in this diagram.

Figure 6:
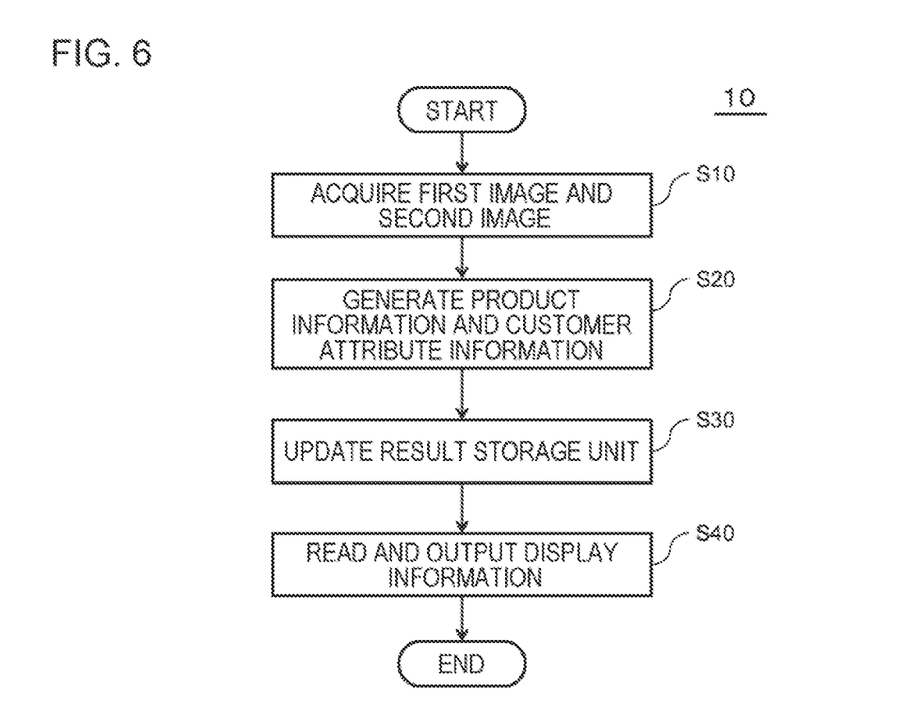
FIG. 6 is a flowchart illustrating an example of processing performed by the customer analysis apparatus.

First, the image acquisition unit 110 in the customer analysis apparatus 10 acquires a first image and a second image (Step S10). Next, the image processing unit 120 generates product information of a product 50 taken out by a customer, by processing the first image and the second image. Further, the image processing unit 120 generates customer attribute information by processing at least the first image (Step S20).

Further, the image processing unit 120 generates clothing information indicating clothing worn by the customer, by processing the first image, and makes the clothing information at least part of the customer attribute information. The image processing unit 120 may at times generate the clothing information by using both the first image and the second image. Examples of clothing indicated by the clothing information include business attire, sportswear, a winter scarf, and mourning.

Further, shoes of the customer are highly likely to be captured in the first image. Then, the image processing unit 120 generates shoe information indicating the shoes worn by the customer, by processing the first image, and makes the shoe information at least part of the customer attribute information. For example, the shoe information indicates the type of the shoes. Examples of the shoe type include business shoes, sports shoes, boots, high heels, pumps, loafers, and sandals. Further, the shoe information may indicate a state of the shoes. Examples of the shoe state include whether the shoes are dry or wet.

Note that, as described above, the image processing unit 120 may use a second image when generating customer attribute information. For example, the image processing unit 120 generates attribute information of a child being short in height by using a second image. In this case, the image processing unit 120 may also determine whether an adult customer is accompanied by a child by using a processing result of the first image and a processing result of the second image. For example, when an adult is captured in a first image and a child is captured in a second image generated at the same timing as the first image, the image processing unit 120 determines that the adult customer is accompanied by the child. When an adult customer visits a store with a child, at least part of attribute information of the customer becomes information indicating that the customer is accompanied by a child and attribute information of the child.

Further, the image processing unit 120 determines the type of a wearing article worn by the customer over the face or on the head, by processing the second image, and makes information indicating the wearing article (hereinafter described as wearing article information) at least part of the customer attribute information. For example, the wearing article information may indicate a mask, sunglasses or glasses, headwear, or a hair band.

Then, the image processing unit 120 causes the result storage unit 130 to store the generated information (Step S30).

Further, the output unit 140 reads display information related to the customer attribute information generated by the image processing unit 120 from the display information storage unit 142 and causes the display apparatus 30 to display the read display information (Step S40).

When the customer attribute information includes shoe information, the output unit 140 reads display information related to the shoe information from the display information storage unit 142.

For example, when the shoe information indicates sneakers or running shoes, the output unit 140 reads at least one item out of advertisement information of a sports drink, advertisement information of protein, and advertisement information of a towel from the display information storage unit 142. When the shoe information indicates high heels or pumps, the output unit 140 reads at least one item out of advertisement information of stockings and advertisement information of an adhesive bandage from the display information storage unit 142. When the shoe information indicates boots or business shoes, the output unit 140 reads advertisement information of socks from the display information storage unit 142. When the shoe information indicates that the shoes are wet, the output unit 140 reads at least one item out of advertisement information of socks and advertisement information of a towel from the display information storage unit 142.

Further, when the customer attribute information includes clothing information of the customer, the output unit 140 reads display information related to the clothing information from the display information storage unit 142.

For example, when the clothing information indicates gloves, tights, or a winter scarf, the output unit 140 reads at least one item out of advertisement information of a warm drink and advertisement information of a pocket body warmer from the display information storage unit 142. When the clothing information is related to sports such as sportswear, the output unit 140 reads at least one item out of advertisement information of a sports drink, advertisement information of protein, and advertisement information of a towel from the display information storage unit 142.

Further, when the clothing information indicates mourning, the output unit 140 reads advertisement information of a gift envelope from the display information storage unit 142.

Furthermore, when the customer attribute information includes wearing article information, the output unit 140 reads display information related to the wearing article information from the display information storage unit 142.

For example, when the wearing article information indicates a mask, the output unit 140 reads at least one item out of advertisement information of a drug for hay fever and/or a cold, advertisement information of a mask, advertisement information of an antiseptic, advertisement information of a warm drink, and advertisement information of a throat lozenge. When the wearing article information indicates a towel, the output unit 140 reads advertisement information of a sports drink from the display information storage unit 142.

Further, when the customer attribute information indicates a customer accompanied by a child, the output unit 140 reads advertisement information of snacks from the display information storage unit 142.

Note that, for example, information stored in the result storage unit 130 by the image processing unit 120 is statistically processed by an external information processing apparatus. Thus, a product 50 placed on the product shelf 40 can be determined, or a product 50 and/or a package of the product 50 can be determined.

As described above, the customer analysis apparatus 10 according to the present example embodiment is used with the first image capture unit 22 and the second image capture unit 24. The first image capture unit 22, the product shelf 40, and the second image capture unit 24 are arranged in this order in the first direction. The first image capture unit 22 is positioned at a height identical to that of or above the product shelf 40 and generates a first image by capturing an image of at least a diagonally lower area. The second image capture unit 24 is positioned at a height identical to that of or below the product shelf 40 and below the first image capture unit 22 and generates a second image by capturing an image of at least a diagonally upper area. Then, the image processing unit 120 in the customer analysis apparatus 10 generates product information indicating a product 50 taken out from the product shelf 40, by processing the first image and the second image. Further, the image processing unit 120 generates customer attribute information indicating an attribute of a customer taking out the product 50, by processing the first image. Then, the image processing unit 120 causes the result storage unit 130 to store the product information and the customer attribute information in association with each other. Accordingly, product information and customer attribute information can be generated with a high degree of precision without increasing the image capture unit.

While the example embodiments of the present invention have been described above with reference to the drawings, the example embodiments are exemplifications of the present invention, and various configurations other than those described above may be employed.

Further, while a plurality of processes (processing) are described in a sequential order in each of a plurality of flowcharts used in the aforementioned description, the execution order of processes executed in each example embodiment is not limited to the order of description. The order of the illustrated processes may be modified without affecting the contents in each example embodiment. Further, the aforementioned example embodiments may be combined without contradicting one another.

The whole or part of the example embodiments described above may be described as, but not limited to, the following supplementary notes.

1. A customer analysis apparatus used with a first image capture unit and a second image capture unit each capturing an image of at least one of a product placement location and an area in front of the product placement location, the customer analysis apparatus including:
    an image acquisition unit for acquiring a first image generated by the first image capture unit and a second image generated by the second image capture unit; and
    an image processing unit for processing the first image and the second image, wherein
    the first image capture unit, the product placement location, and the second image capture unit are arranged in this order in a first direction,
    the first image capture unit is positioned at a height identical to that of or above the product placement location and captures an image of at least a diagonally lower area,
    the second image capture unit is positioned at a height identical to that of or below the product placement location and below the first image capture unit and captures an image of at least a diagonally upper area, and
    the image processing unit
        generates product information indicating a product taken out from the product placement location, by processing the first image and the second image,
        generates customer attribute information indicating an attribute of a customer taking out the product, by processing the first image, and
        causes a storage unit to store the product information and the customer attribute information in association with each other.
2. The customer analysis apparatus according to aforementioned 1, wherein
    the image processing unit generates shoe information indicating a shoe worn by the customer, by processing the first image, and makes the shoe information at least part of the customer attribute information.
3. The customer analysis apparatus according to aforementioned 1 or 2, wherein
    the image processing unit generates clothing information indicating clothing worn by the customer, by processing the first image, and makes the clothing information at least part of the customer attribute information.
4. The customer analysis apparatus according to any one of aforementioned 1 to 3, wherein
    the image processing unit makes wearing article information indicating a wearing article worn over a face of the customer at least part of the customer attribute information, by further processing the second image.
5. The customer analysis apparatus according to any one of aforementioned 1 to 4, wherein
    the image processing unit generates child attribute information indicating an attribute of a child accompanying the customer, by further processing the second image, and makes the child attribute information at least part of the customer attribute information.
6. The customer analysis apparatus according to any one of aforementioned 1 to 5, wherein
    a display unit is provided at the product placement location or a store in which the product placement location is provided, and
    the customer analysis apparatus further includes
        an information selection unit for acquiring display information to be displayed by the display unit, by using the customer attribute information, and causing the display unit to display the acquired display information.
7. A customer analysis method performed by a computer used with a first image capture unit and a second image capture unit each capturing an image of at least one of a product placement location and an area in front of the product placement location, the customer analysis method including, by the computer:
    acquiring a first image generated by the first image capture unit and a second image generated by the second image capture unit;
    generating product information indicating a product taken out from the product placement location, by processing the first image and the second image;
    generating customer attribute information indicating an attribute of a customer taking out the product, by processing the first image; and
    causing a storage unit to store the product information and the customer attribute information in association with each other, wherein
    the first image capture unit, the product placement location, and the second image capture unit are arranged in this order in a first direction,
    the first image capture unit is positioned at a height identical to that of or above the product placement location and captures an image of at least a diagonally lower area, and
    the second image capture unit is positioned at a height identical to that of or below the product placement location and below the first image capture unit and captures an image of at least a diagonally upper area.
8. The customer analysis method according to aforementioned 7, further including, by the computer, generating shoe information indicating a shoe worn by the customer, by processing the first image, and making the shoe information at least part of the customer attribute information.

9. The customer analysis method according to aforementioned 7 or 8, further including, by the computer,
generating clothing information indicating clothing worn by the customer, by processing the first image, and making the clothing information at least part of the customer attribute information.

10. The customer analysis method according to any one of aforementioned 7 to 9, further including, by the computer,
generating wearing article information indicating a wearing article worn over a face of the customer, by further processing the second image, and making the wearing article information at least part of the customer attribute information.

11. The customer analysis method according to any one of aforementioned 7 to 10, further including, by the computer,
generating child attribute information indicating an attribute of a child accompanying the customer, by further processing the second image, and making the child attribute information at least part of the customer attribute information.

12. The customer analysis method according to any one of aforementioned 7 to 11, wherein
a display unit is provided at the product placement location or a store in which the product placement location is provided, and
the customer analysis method further includes, by the computer,
acquiring display information to be displayed by the display unit, by using the customer attribute information, and causing the display unit to display the acquired display information.

13. A program executed by a computer used with a first image capture unit and a second image capture unit each capturing an image of at least one of a product placement location and an area in front of the product placement location, the program causing the computer to execute:
a function of acquiring a first image generated by the first image capture unit and a second image generated by the second image capture unit;
a function of generating product information indicating a product taken out from the product placement location, by processing the first image and the second image;
a function of generating customer attribute information indicating an attribute of a customer taking out the product, by processing the first image; and
a function of causing a storage unit to store the product information and the customer attribute information in association with each other, wherein
the first image capture unit, the product placement location, and the second image capture unit are arranged in this order in a first direction,
the first image capture unit is positioned at a height identical to that of or above the product placement location and captures an image of at least a diagonally lower area, and
the second image capture unit is positioned at a height identical to that of or below the product placement location and below the first image capture unit and captures an image of at least a diagonally upper area.

14. The program according to aforementioned 13, further causing the computer to
generate shoe information indicating a shoe worn by the customer, by processing the first image, and make the shoe information at least part of the customer attribute information.

15. The program according to aforementioned 13 or 14, further causing the computer to
generate clothing information indicating clothing worn by the customer, by processing the first image, and make the clothing information at least part of the customer attribute information.

16. The program according to any one of aforementioned 13 to 15, further causing the computer to
generate wearing article information indicating a wearing article worn over a face of the customer, by further processing the second image, and make the wearing article information at least part of the customer attribute information.

17. The program according to any one of aforementioned 13 to 16, further causing the computer to
generate child attribute information indicating an attribute of a child accompanying the customer, by further processing the second image, and make the child attribute information at least part of the customer attribute information.

18. The program according to any one of aforementioned 13 to 17, wherein
a display unit is provided at the product placement location or a store in which the product placement location is provided, and
the program further causes the computer to execute
a function of acquiring display information to be displayed by the display unit, by using the customer attribute information, and causing the display unit to display the acquired display information.

REFERENCE SIGNS LIST

10 Customer analysis apparatus
22 First image capture unit
24 Second image capture unit
30 Display apparatus
40 Product shelf
42 Front frame
50 Product
110 Image acquisition unit
120 Image processing unit
122 Processing method storage unit
130 Result storage unit
140 Output unit
142 Display information storage unit
200 Image capture apparatus
210 Image capturing unit
220 Lighting unit

The invention claimed is:
1. An information processing apparatus comprising:
at least one memory storing instructions; and
at least one processor configured to execute the instructions to perform operations comprising:
acquiring an image in which a customer is captured;
generating at least one of shoe information and wearing article information by processing the acquired image, the shoe information indicating whether shoes worn by the customer are dry or wet and the wearing article information indicating any one of a mask, sunglasses, glasses, and a hair band worn by the customer over a face or on a head; and displaying a display information, which is determined based on the generated at least one of the shoe information and the wearing article information, on a display apparatus.

2. The information processing apparatus according to claim 1, wherein the display information is advertisement information.

3. An information processing method executed by a computer and comprising:

acquiring an image in which a customer is captured;

generating at least one of shoe information and wearing article information by processing the acquired image, the shoe information indicating whether shoes worn by the customer are dry or wet and the wearing article information indicating any one of a mask, sunglasses, glasses, and a hair band worn by the customer over a face or on a head; and displaying a display information, which is determined based on the generated at least one of the shoe information and the wearing article information, on a display apparatus.

4. The information processing method according to claim 3, wherein the display information is advertisement information.

5. A non-transitory storage medium storing a program executable by a computer to perform an information processing method comprising:

acquiring an image in which a customer is captured;

generating at least one of shoe information and wearing article information by processing the acquired image, the shoe information indicating whether shoes worn by the customer are dry or wet and the wearing article information indicating any one of a mask, sunglasses, glasses, and a hair band worn by the customer over a face or on a head; and displaying a display information, which is determined based on the generated at least one of the shoe information and the wearing article information, on a display apparatus.

6. The non-transitory storage medium according to claim 5, wherein the display information is advertisement information.

* * * * *